US008286746B2

(12) United States Patent
Miyajima et al.

(10) Patent No.: US 8,286,746 B2
(45) Date of Patent: Oct. 16, 2012

(54) FRONT STORAGE COMPARTMENT WITH WATER DRAINAGE CHANNEL FOR A VEHICLE, AND VEHICLE INCORPORATING SAME

(75) Inventors: Yu Miyajima, Saitama (JP); Akiko Ishikawa, Saitama (JP); Kazuya Minowa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 46 days.

(21) Appl. No.: 13/045,974

(22) Filed: Mar. 11, 2011

(65) Prior Publication Data

US 2011/0227311 A1    Sep. 22, 2011

(30) Foreign Application Priority Data

Mar. 16, 2010  (JP) .................................. 2010-059232

(51) Int. Cl.
*B62K 11/00*  (2006.01)
*B60R 5/02*  (2006.01)

(52) U.S. Cl. ........................ 180/219; 296/37.1; 296/78.1
(58) Field of Classification Search ................. 296/37.1, 296/78.1; 180/218, 220; 280/202
See application file for complete search history.

(56) References Cited

FOREIGN PATENT DOCUMENTS

JP             3484919 B2    1/2004

*Primary Examiner* — Tony Winner
(74) *Attorney, Agent, or Firm* — Carrier Blackman & Associates, P.C.; Joseph P. Carrier; William D. Blackman (57) ABSTRACT

A front storage compartment for a scooter-type vehicle includes a plate member mounted on a cover member covering a vehicle body of the vehicle. The plate member and the cover member jointly define an upwardly open storage unit therebetween. The cover member has a water drain hole formed therein for draining water from the storage unit. The water drain hole is located at a position below a floor panel which closes the bottom of the storage unit. The plate member has a lower extension for covering the water drain hole and the cover member, below the floor panel. A water channel for guiding water to the water drain hole is provided between the lower extension of the plate member and the cover member. Such front storage compartment structure reduces an amount of water seeping out to the surface of the cover member.

20 Claims, 9 Drawing Sheets

FRONT STORAGE COMPARTMENT WITH WATER DRAINAGE CHANNEL FOR A VEHICLE, AND VEHICLE INCORPORATING SAME

CROSS-REFERENCE TO RELATED APPLICATIONS

The present invention claims priority under 35 USC 119 based on Japanese patent application No. 2010-059232, filed on Mar. 16, 2010. The entire subject matter of this priority document, including specification claims and drawings thereof, is incorporated by reference herein.

BACKGROUND OF THE INVENTION

1. Field of the Invention

The present invention relates to a front storage compartment structure for a vehicle, and to a vehicle incorporating the same. More particularly, the present invention relates to a front storage compartment structure formed by mounting a plate member on a cover member of a scooter-type vehicle, in which the cover member and a lower extension of the plate member define a water channel therebetween, which extends obliquely upwardly and laterally from a water drain hole in a transverse direction of the vehicle, for guiding water to the water drain hole of the cover member, and to a vehicle incorporating the same.

2. Description of the Background Art

There is a known a scooter-type vehicle having a storage unit (front storage compartment) for storing articles introduced therein from above (for example, see Japanese Patent No. 3484919, specifically FIG. 8 thereof).

As shown in FIG. 8 of the Japanese Patent No. 3484919, a plate member (16) is mounted on a cover member (15) (reference numerals in parentheses represent numbers referred to in the Japanese Patent No. 3484919, also applicable to other reference numerals in parentheses below) which covers a vehicle body. The plate member (16) and the cover member (15) make up a front storage compartment which is open upwardly.

At the bottom of the storage unit, the cover member (15) has a rib (20), and the plate member (16) has a corresponding groove (26) formed in an edge thereof for engaging the rib (20).

While the vehicle is driven during rain, rainwater which has entered the storage unit reaches the bottom of the storage unit, then flows along a gap between the rib (20) and the groove (26), and subsequently flows out of the storage unit from a drain hole formed in the cover member (15).

In the front storage compartment structure, as disclosed in the Japanese Patent No. 3484919, however, an increased amount of rainwater that enters the storage unit causes water to overflow the gap between the rib (20) and the groove (26), to seep outwardly from the edge of the plate member (16), and to flow down the surface of the cover member (15). When the water has dried, it tends to smear the surface of the cover member (15) with a water stain. The water stain causes impairment in appearance of areas around the front storage compartment.

The present invention is made to overcome such drawbacks of the existing front storage compartment structure for a vehicle. According it is one of the objects of the present invention to provide a front storage compartment structure for a vehicle which is capable of draining an increased volume of accumulated water therefrom, thereby reducing an amount of water seeping out to the surface of a cover member, thereby to avoid water staining and thereby improve the long-term appearance of areas around the front storage compartment.

SUMMARY OF THE INVENTION

In order to achieve the above objects, the present invention according to a first aspect thereof provides a front storage compartment structure for a vehicle. The front storage compartment structure according to the first aspect includes a plate member mounted on a cover member covering part of a vehicle body. The plate member and the cover member jointly define a storage unit therebetween, which opens upwardly for receiving articles therein which are introduced from above.

The cover member has a water drain hole formed therein for draining water from the storage unit. The water drain hole is located at a position below a floor panel of the cover member, which closes a bottom portion of the storage unit. The plate member has a lower extension formed on a lower portion thereof which covers the water drain hole and the cover member, below the bottom portion. A water channel is provided between the lower extension of the plate member and the cover member. The water channel extends obliquely upwardly from the water drain hole, and laterally in a transverse direction of the vehicle, for guiding the water to the water drain hole.

According to a second aspect of the present invention, the water channel includes a step on the cover member.

According to a third aspect of the present invention, the step on the cover member includes either a rib or a groove, and the plate member has a groove or a rib corresponding to the rib or the groove of the cover member.

According to a fourth aspect of the present invention, the cover member includes a mount for securing the lower extension of the plate member to the cover member. The mount is disposed at a position above the water drain hole. The step extends from a position near the mount to the water drain hole.

According to a fifth aspect of the present invention, in an assembled state of the front storage compartment structure, a size of the water drain hole doubles as an attachment hole through which the lower extension is installed on the cover member.

EFFECTS OF THE INVENTION

According to the first aspect of the present invention, the water channel is disposed at a position below the bottom of the storage unit, and extends from the water drain hole obliquely upwardly and laterally in a transverse direction of the vehicle. Accordingly, water which has entered the storage unit is guided down the water channel to the water drain hole.

The water channel and the water drain hole are covered with the lower extension extending from the lower portion of the plate member.

Since the water channel and the water drain hole are covered with the lower extension of the plate member, the water channel and the water drain hole are concealed from external view.

According to the present invention, the water channel is covered with the lower extension of the plate member. Even when water seeps out of the water channel, inasmuch as the water channel is covered with the lower extension of the plate member, the amount of water seeping onto the surface of the cover member is reduced. Since the amount of water seeping onto the surface of the cover member is reduced, the surface of the cover member is not liable to be smeared by the seeping water.

According to the present invention, since the water channel and the water drain hole are covered with the lower extension of the plate member, the appearance of the front storage compartment is improved. As the water channel is covered with the lower extension, the amount of water seeping onto the surface of the cover member is reduced as compared to the previously known designs, improving the long-term appearance of the front storage compartment and the immediate area therearound.

According to the second aspect of the present invention, the water channel includes a step formed on the cover member.

According to the present invention, since the water channel is integrally formed with the cover member, the number of parts used is reduced. In addition, the water channel is of a simple construction as it is provided by the step.

According to the third aspect of the present invention, the step on the cover member includes either a rib or a groove, and the plate member has a groove or a rib corresponding to the rib or the groove of the cover member. The water channel is constructed of a simple and appropriately shaped combination of the groove and the rib corresponding thereto. The water channel thus constructed can be made complex in cross-sectional shape.

According to the present invention, in addition, as the height of the rib and the depth of the groove can be selected as desired, the water channel can be formed to a shape and size optimum for an amount of water flow therethrough from the bottom portion of the front storage compartment.

The step is effective in reducing an amount of water which flows downwardly before reaching the water drain hole from the step. As a result, the water channel can guide much water to the water drain hole.

According to the fourth aspect of the present invention, since the step extends from a position near the mount to the water drain hole, the step of the cover member and the step of the plate member can be positioned with higher accuracy than if the step is disposed in a position spaced from the mount. Inasmuch as the step serving as the water channel is disposed near the mount, the rib engages in the groove or the groove receives the rib with increased accuracy. If the rib engages in the groove with increased accuracy, then the dimensional accuracy of the water channel is increased. As a result, much more water can be to the water drain hole.

According to the fifth aspect of the present invention, in an assembled state of the front storage compartment, size the water drain hole doubles as an attachment hole through which the lower extension is installed on the cover member.

According to the present invention, since the lower extension of the plate member is installed on the cover member through the water drain hole, the plate member is reliably supported on the cover member without requiring increased number of parts.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention. A mode for carrying out the present invention will be described in detail below.

In other words, in the drawings and embodiment, the terms "upper," "lower," "front," "rear," "left," "right," and other similar directional expressions represent directions as seen by a rider riding on a motorcycle. The drawings should be seen in the direction of reference characters.

Illustrative Embodiment

An illustrative embodiment of the present invention will be described below with reference to the drawings.

Figure 1:
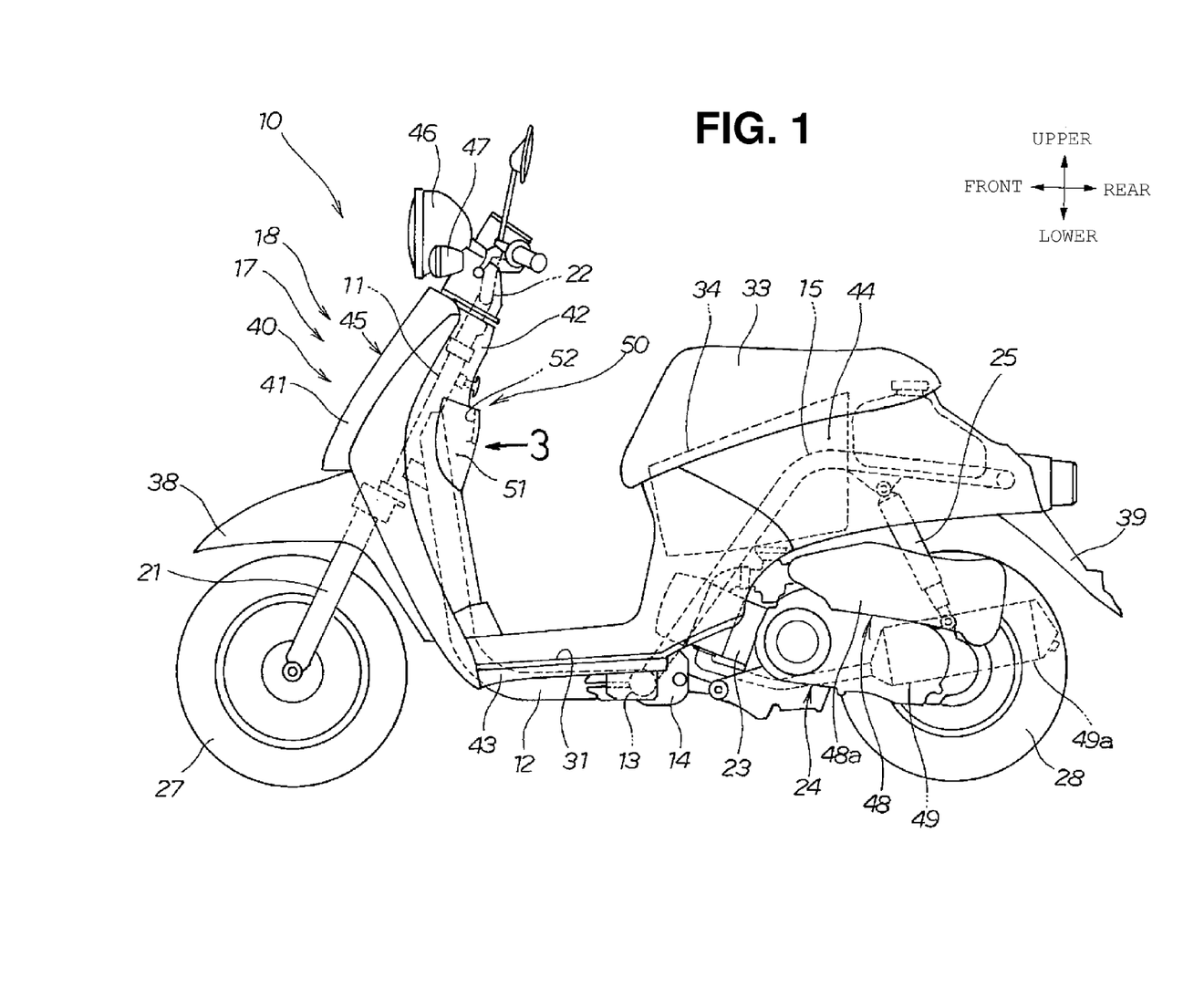
FIG. 1 is a left side plan view of a scooter-type vehicle according to the present invention.

As shown in FIG. 1, a scooter-type vehicle 10 has a vehicle frame 17 which includes, as main components thereof, a head pipe 11, a main frame 12 extending obliquely rearwardly and downwardly from the head pipe 11 and then extending rearwardly, a cross frame 13 extending from a rear end of the main frame 12 transversely across the vehicle, a pivot member 14 attached to the cross frame 13, and a rear frame section 15 extending obliquely rearwardly and upwardly from the cross frame 13 and then extending rearwardly.

A fork member 21 is angularly movably disposed below the head pipe 11. A steering handle 22 integral with the fork member 21 is disposed above the head pipe 11. A power unit 24 including an engine 23 is swingably mounted on the pivot member 14. A shock absorber 25 is interposed between the power unit 24 and the rear frame section 15.

A front wheel 27 is supported by a shaft on a lower end of the fork member 21. A rear wheel 28, as a drive wheel, is supported by a shaft on a rear end of the power unit 24.

A rider's running board 31 is positioned between the front wheel 27 and the rear wheel 28. A leg shield 45, as a wind shield, is disposed forwardly of the running board 31. A rider's seat 33 is disposed behind the running board 31 at a position confronting the leg shield 45. The rider's seat 33 selectively covers a rear storage box 34 supported by the rear frame section 15, as shown.

The vehicle frame 17 is partially covered by a cover member 40. The cover member 40 includes a front cover 41 for covering a front portion of the head pipe 11, an inner cover 42 for covering a rear portion of the head pipe 11, an under cover 43 for covering side portions of the running board 31, and a side cover 44 for covering side rear portions of the vehicle.

The inner cover 42 is mounted on the head pipe 11, and a lower end thereof is coupled to the running board 31.

The leg shield 45 includes the front cover 41 and the inner cover 42.

The vehicle according to the present invention includes a front storage compartment 50, including a plate member 51 mounted on the inner cover 42. The plate member 51 and the inner cover 42 cooperate define a storage unit 52 (space 52) therebetween. The storage unit opens upwardly for storing articles introduced therein from above. The storage unit 52 is a space sandwiched between the inner cover 42 and the plate member 51 and disposed above a floor panel 56. The floor panel 56 may be integrally formed with, and extend outwardly from the inner cover 42.

An intake system 48 including an air cleaner 48a and an exhaust system 49 including a muffler 49a are coupled to the engine 23. A head light 46 and turn signal lamps 47 are mounted on the steering handle 22. A front fender 38 is disposed above the front wheel 27. A rear fender 39 is disposed behind and above the rear wheel 28.

Components of the inner cover 42 and the plate member 51 mounted on the inner cover 42 will be described below.

Figure 2:
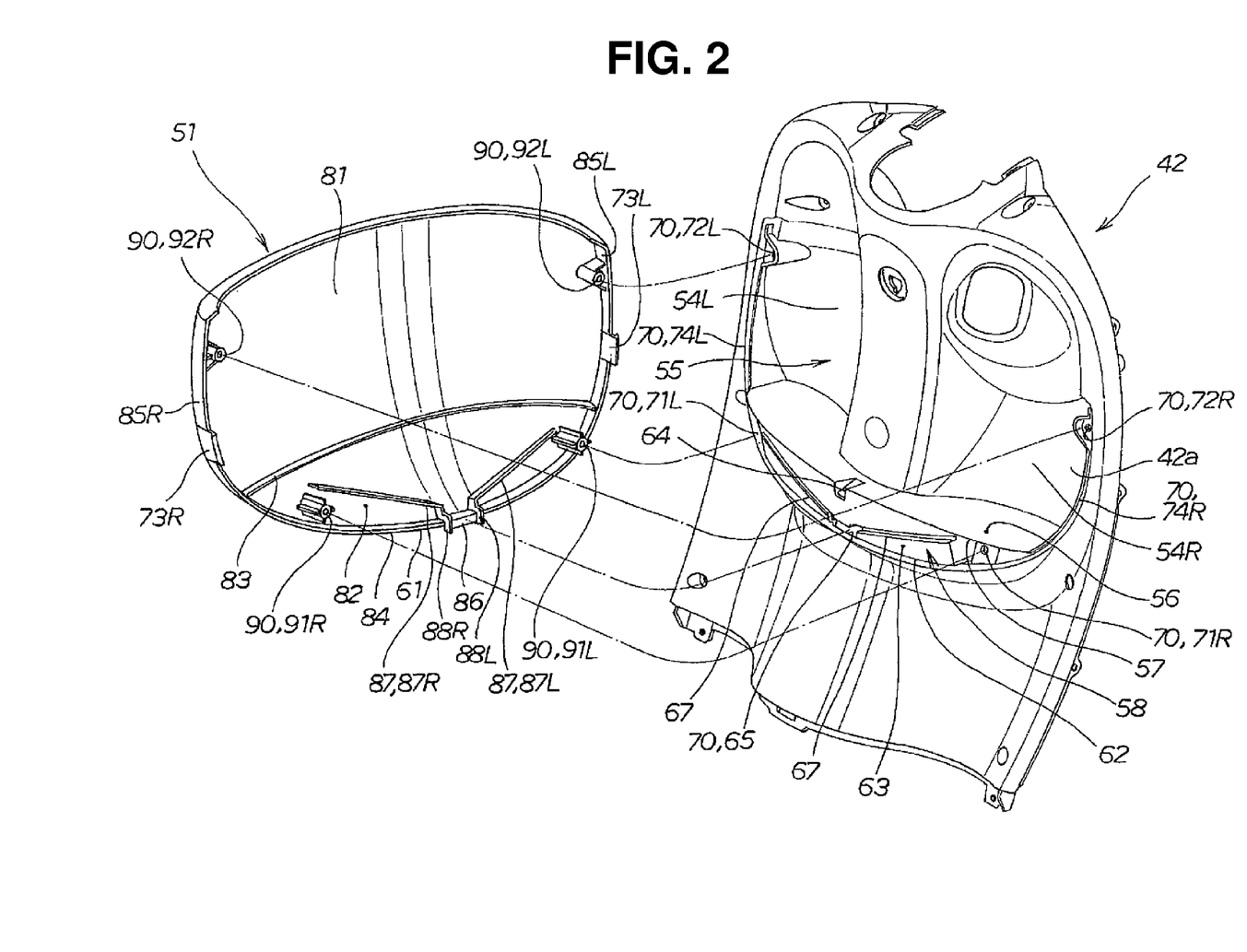
FIG. 2 is an exploded perspective view of a front storage compartment structure of the scooter-type vehicle of the present invention.

As shown in FIG. 2, the inner cover 42 is a component of the cover member 40. The inner cover has a surface 42a including an upper side surface 55 having left and right bulging surfaces 54L, 54R which extend downwardly and bulge forwardly with respect to the vehicle. The floor panel 56 extends substantially horizontally rearwardly from a lower end of the upper side surface 55, with respect to the vehicle, and closes off the bottom of the storage unit.

In addition, a lower side surface 58 extends downwardly from a corner 57 at a rear end of the floor panel 56. The lower side surface 58 has a recess 62 in which a lower edge 61 of the plate member 51 is engaged. The recess 62 and the corner 57 surround a surface serving as a bottom lower side surface 63. The floor panel 56 has a bottom hole 64 formed therein at a center thereof in the transverse direction of the vehicle, for draining water off the floor panel 56.

The bottom lower side surface 63 which is located at a position below the floor panel 56 has a water drain hole 65 formed therein for draining water from the storage unit 52, and grooves 67 formed therein which extend from the water drain hole 65 obliquely upwardly and laterally in the transverse direction of the vehicle, as steps for guiding water to the water drain hole 65.

Specifically, the inner cover 42 includes the floor panel 56, and the water drain hole 65 for draining water from the storage unit 52. The water drain hole 65 is formed below the floor panel 56. The groove 67 extends from the water drain hole 65 obliquely upwardly and laterally in the transverse direction of the vehicle. The groove 67 is formed in the bottom lower side surface 63.

The inner cover 42 has a plurality of supports 70 (for example, seven supports 70) for supporting the plate member 51. The seven supports 70 include a plurality of mounts (for example, four mounts) including left and right lower mounts 71L, 71R and left and right upper mounts 72L, 72R disposed above the left and right lower mounts 71L, 71R, and a plurality of engaging member (for example, three engaging members) including left and right engaging holes 74L, 74R for receiving left and right engaging fingers 73L, 73R of the plate member 51 to be inserted therein and the water drain hole 65 for receiving a lower engaging finger 86 of the plate member 51 to be inserted therein. The four mounts (71L, 71R, 72L, 72R) support corresponding members by way of fastening.

The plate member 51 includes a rack 81, a lower extension 82 extending downwardly from the rack 81, an intermediate rib 83 extending laterally in the transverse direction of the vehicle along the boundary between the lower extension 82 and the rack 81 and disposed closely to the floor panel 56, a lower edge rib 84 disposed below the intermediate rib 83 and extending along a lower edge of the lower extension 82, left and right edge ribs 85L, 85R extending along left and right edges of the rack 81 in the transverse direction of the vehicle, and the lower engaging finger 86 which is disposed on a lower end of the lower extension 82 for engaging in the water drain hole 65. Ribs 87 (87L, 87R) extend as steps from the lower engaging finger 86 obliquely upwardly and laterally in the transverse direction of the vehicle.

Left and right small ribs 88L, 88R project from left and right edges of the lower engaging finger 86. The left rib 87L is contiguous to the left small rib 88L, and the right rib 87R is contiguous to the right small rib 88R.

According to the present embodiment, the ribs 87 of the plate member 51 engage in the grooves 67 formed in the inner cover 42.

The lower extension 82 on a lower portion of the plate member 51 serves to cover the water drain hole 65 and the cover member 40 below the floor panel 56.

The left and right engaging fingers 73L, 73R for engaging the inner cover 42 are provided on the left and right edge ribs 85L, 85R of the plate member 51. The plate member 51 has four seats 90 at positions in alignment with the supports 70 on the leg shield. The four seats 90 include left and right lower seats 91L, 91R and left and right upper seats 92L, 92R disposed above the left and right lower seats 91L, 91R.

When the lower engaging finger 86 is inserted into the water drain hole 65, the left and right engaging fingers 73L, 73R are inserted into the left and right engaging holes 74L, 74R, the left and right lower seats 91L, 91R are placed against the left and right lower mounts 71L, 71R, and the left and right upper seats 92L, 92R are placed against the left and right upper mounts 72L, 72R, the storage unit 52 which is open upwardly is formed between the plate member 51 and the cover member 40, thereby providing a front storage compartment for allowing articles to be introduced from above into the storage unit 52.

The floor panel 56 of the front storage compartment is provided on the cover member 40, and closes the bottom of the storage unit 52.

In the present embodiment, the cover member has the bottom of the front storage compartment. However, the bottom of the front storage compartment may be provided on the plate member.

Figure 3:
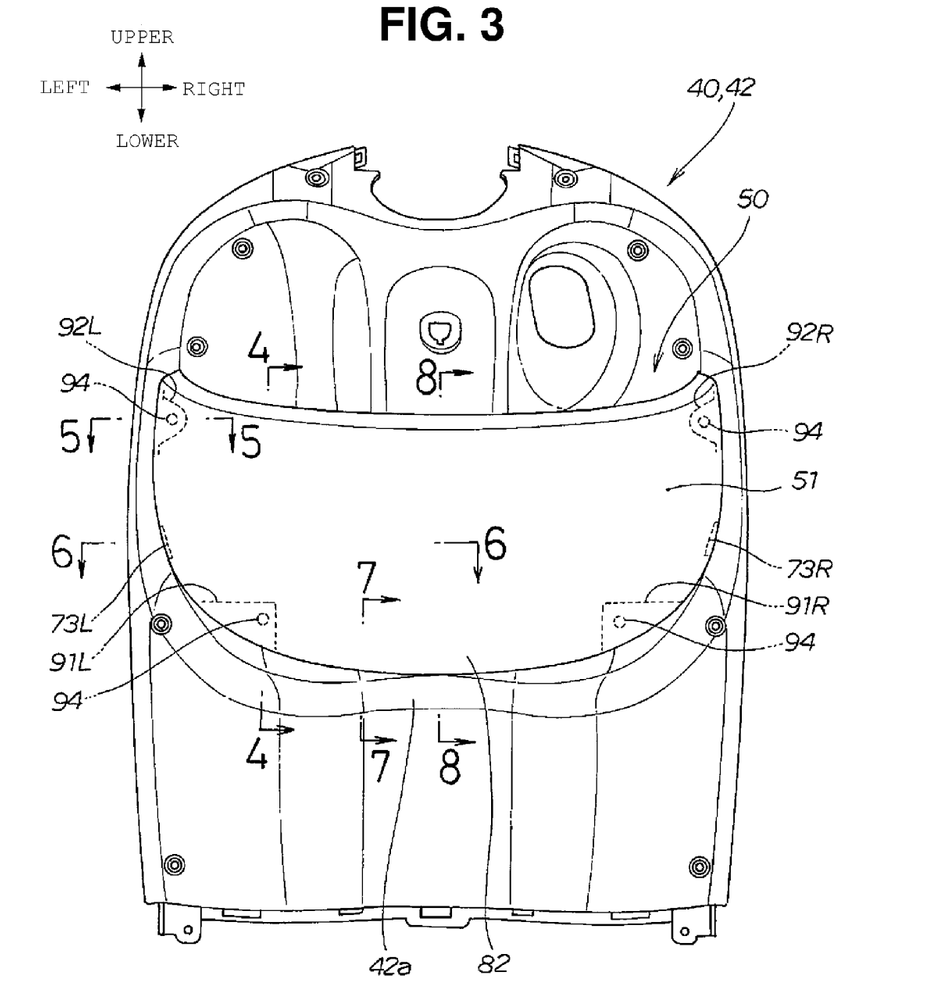
FIG. 3 is a detail view of the front storage compartment, seen along arrow 3 of FIG. 1.

As shown in FIG. 3, the plate member 51 is mounted on a vertically intermediate portion of the inner cover 42. The front storage compartment 50 which is open upwardly and is capable of storing articles therein is formed between the plate member 51 and the inner cover 42 as the cover member 40.

Structural details of the front storage compartment 50 will be described below.

A structure for securing the plate member to the leg shield will mainly be described below with reference to FIGS. 4 through 6.

The lower mounts on which the plate member is mounted will be described below.

Figure 4:
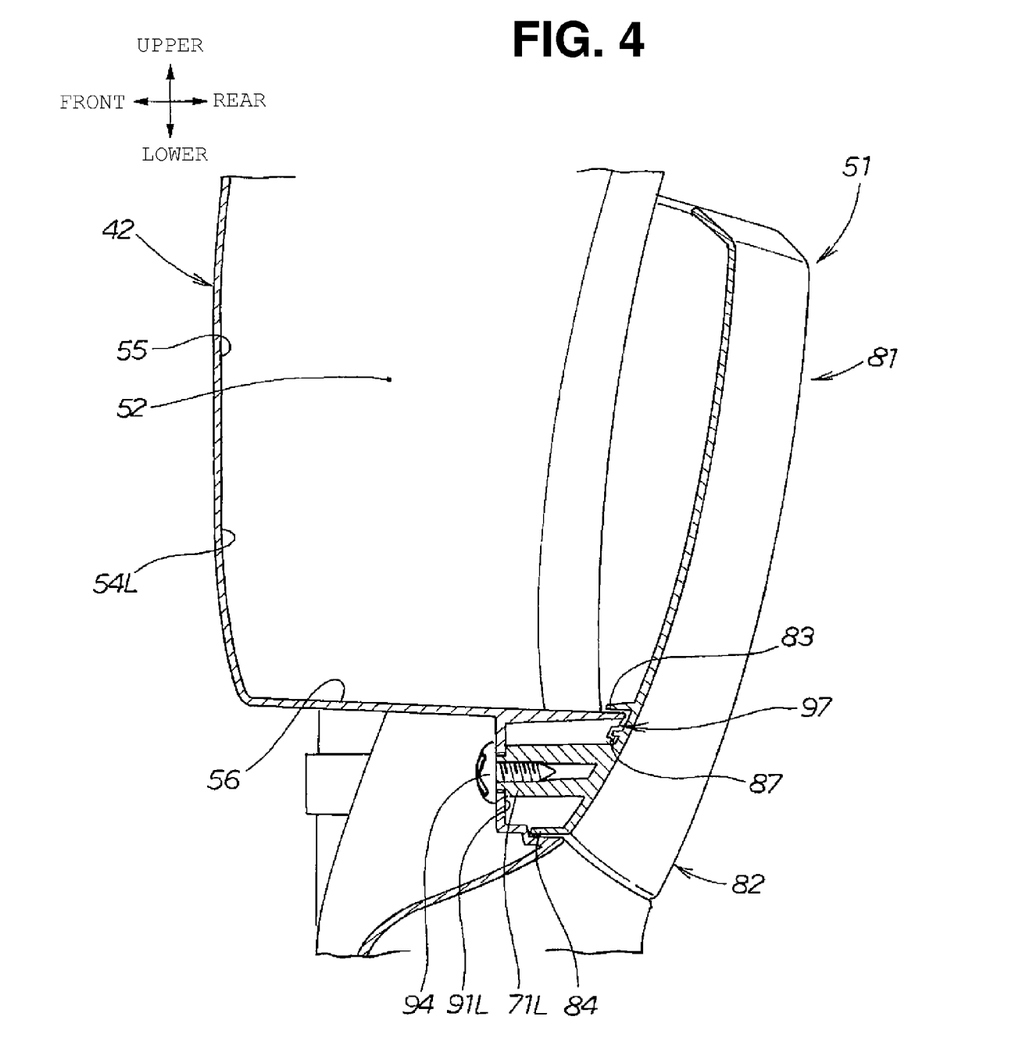
FIG. 4 is a cross-sectional view of the front storage compartment, taken along line 4-4 of FIG. 3.

As shown in FIG. 4, the left lower seat 91L is provided on the inner cover 42. The left lower mount 71L of the plate member 51 is placed against the left lower seat 91L, and a fastener 94 is threaded into the left lower seat 91L and the left lower mount 71L in the rearward direction of the vehicle, thereby fastening the plate member 51 to the inner cover 42.

The above structure is a left mount structure of the plate member in the transverse direction of the vehicle. A right mount structure of the plate member in the transverse direction of the vehicle is similar to the above structure and will not be described below.

The upper mounts on which the plate member is mounted will be described below.

Figure 5:
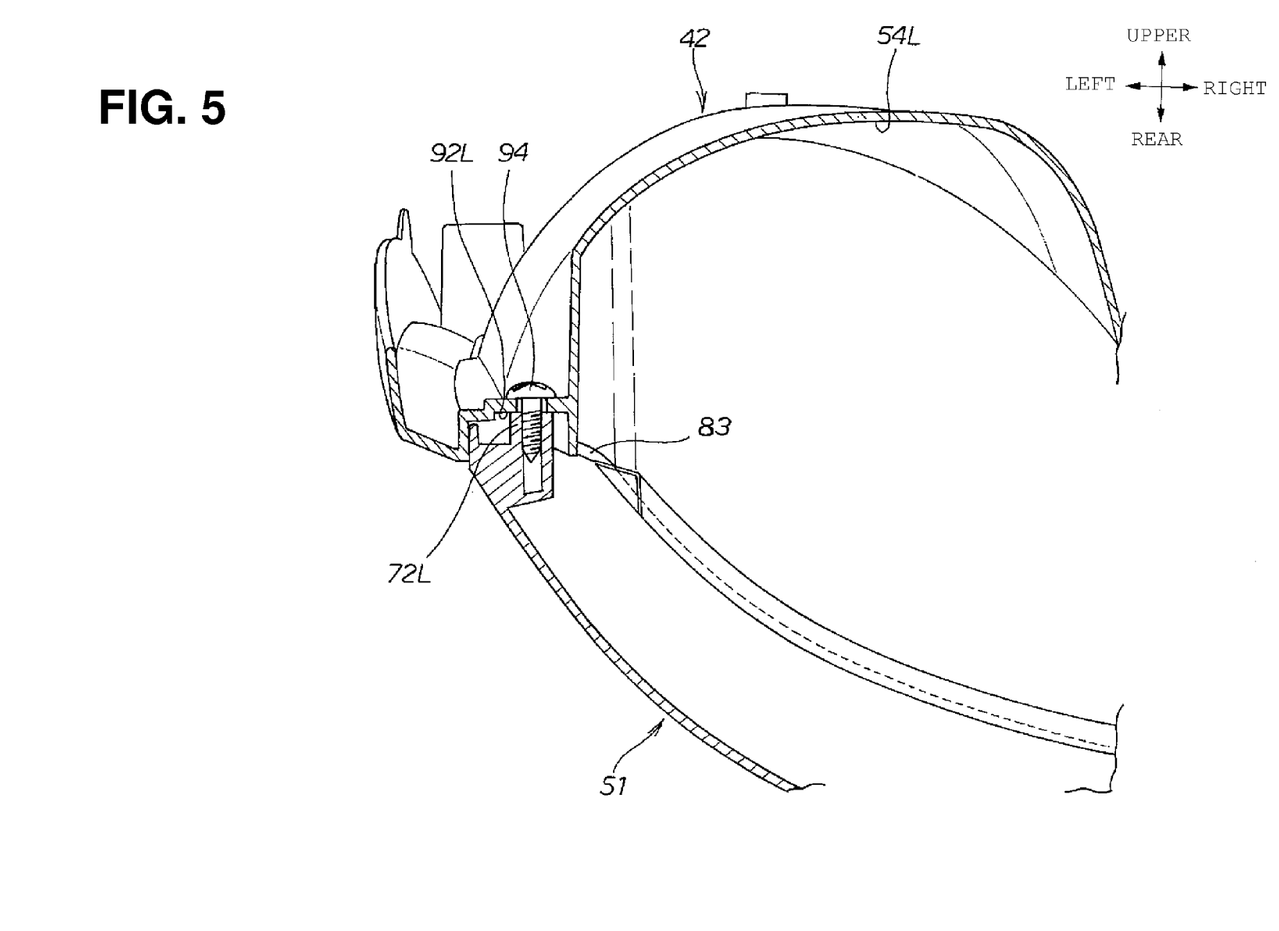
FIG. 5 is a cross-sectional view of the front storage compartment, taken along line 5-5 of FIG. 3.

As shown in FIG. 5, the left upper seat 92L is provided on the inner cover 42. The left upper mount 72L of the plate member 51 is placed against the left upper seat 92L, and a fastener 94 is threaded into the left upper seat 92L and the left upper mount 72L in the rearward direction of the vehicle, thereby fastening the plate member 51 to the inner cover 42.

The above structure is a left mount structure of the plate member in the transverse direction of the vehicle. A right mount structure of the plate member in the transverse direction of the vehicle is similar to the above structure and will not be described below.

The engaging members on which the plate member is installed will be described below.

Figure 6:
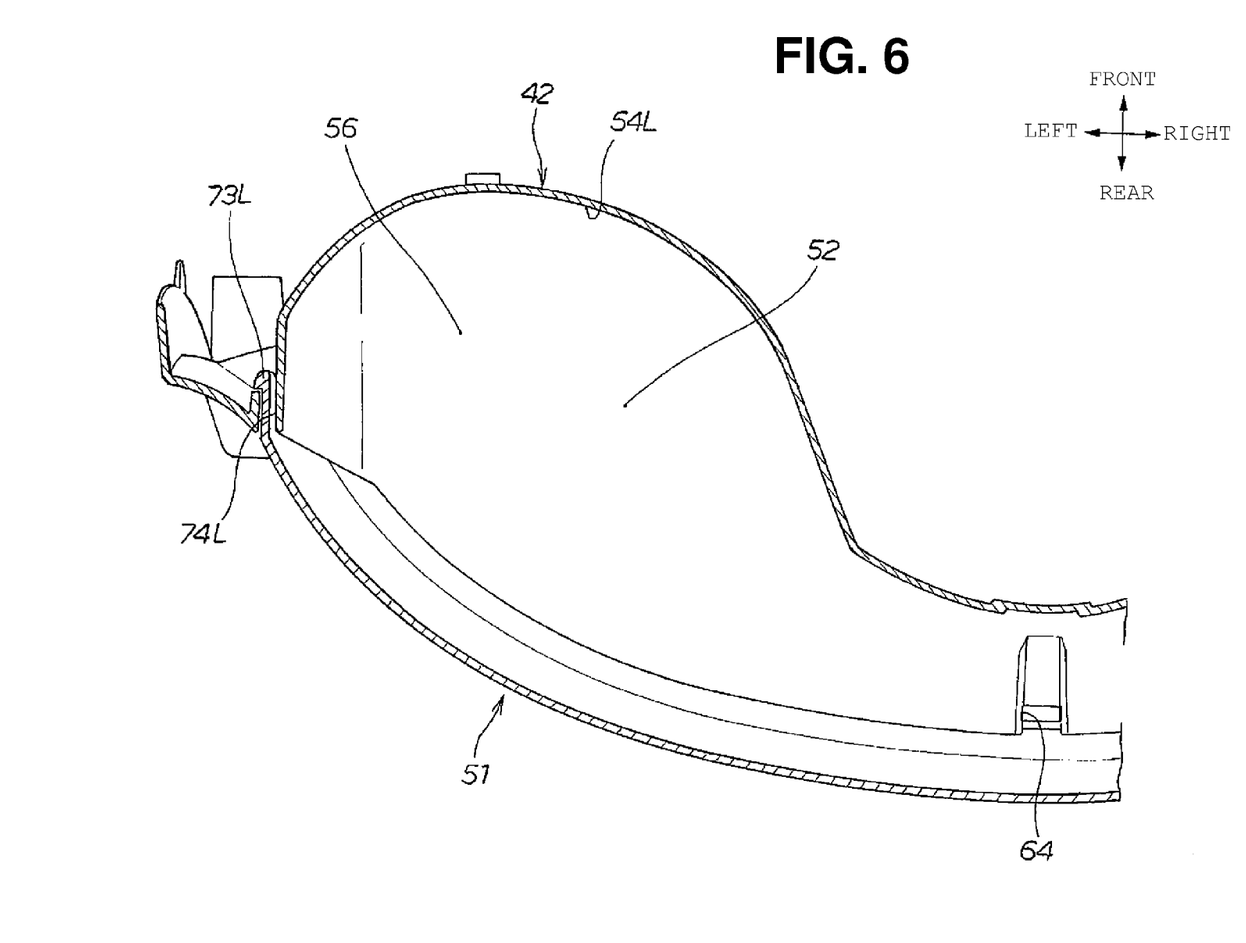
FIG. 6 is a cross-sectional view of the front storage compartment, taken along line 6-6 of FIG. 3.

As shown in FIG. 6, the left engaging finger 73L is provided on the left end of the plate member 51, and engages in the left engaging hole 74L in the leg shield.

The above structure is a left mount structure of the plate member in the transverse direction of the vehicle. A right mount structure of the plate member in the transverse direction of the vehicle is similar to the above structure and will not be described below.

Figure 8:
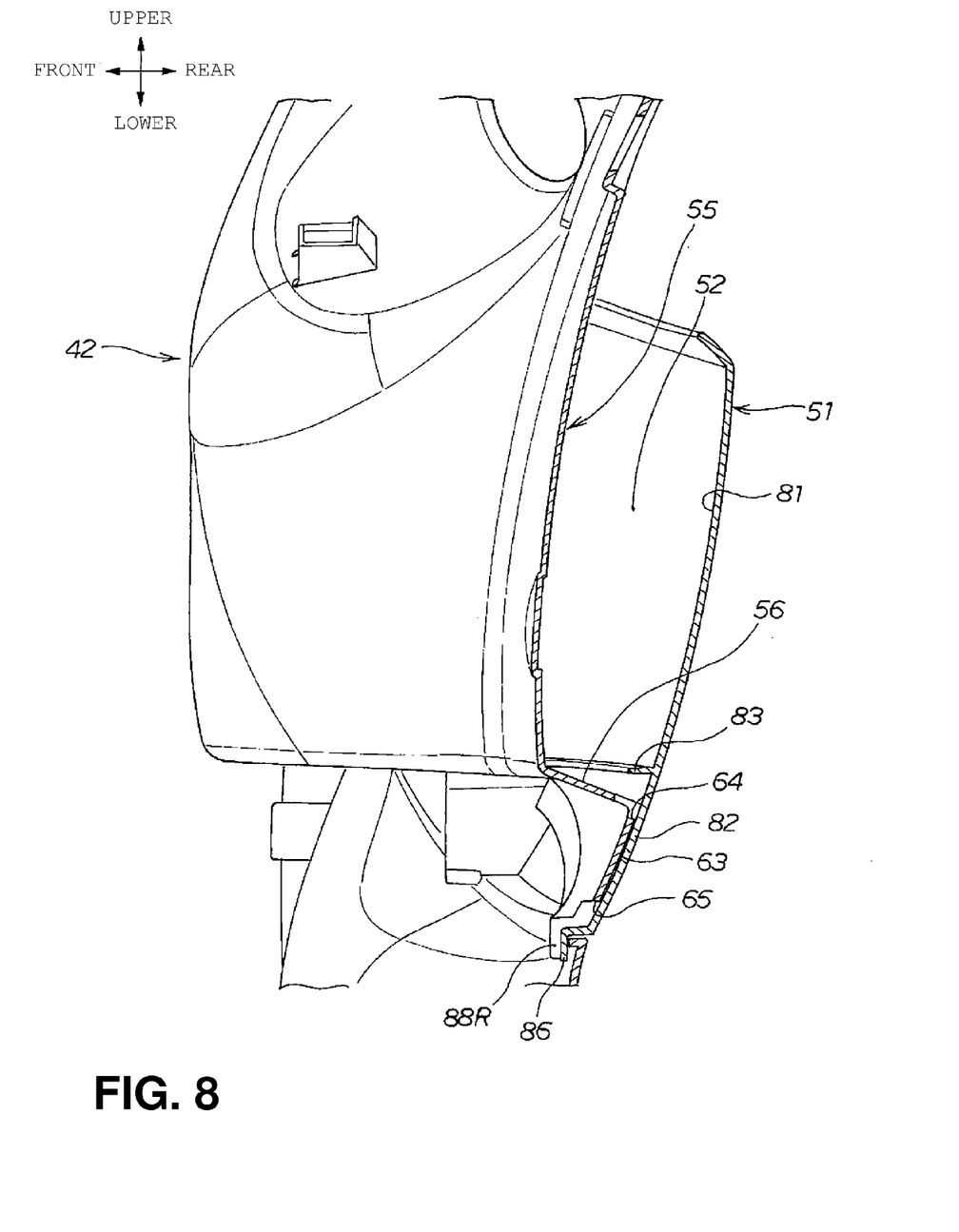
FIG. 8 is a cross-sectional view of the front storage compartment, taken along line 8-8 of FIG. 3.

As shown in FIG. 8, the lower engaging finger 86 is provided on the lower end of the plate member, and engages in the water drain hole 65 in the inner cover 42.

The plate member 51 is secured to the inner cover 42 by the arrangement described above with reference to FIGS. 4 through 6 and 8.

The structure of a water channel for guiding rainwater which has entered the storage unit out of the front storage compartment 50, i.e., to the reverse side of the inner cover 42, will be described below with reference to FIGS. 7 through 9.

Figure 7:
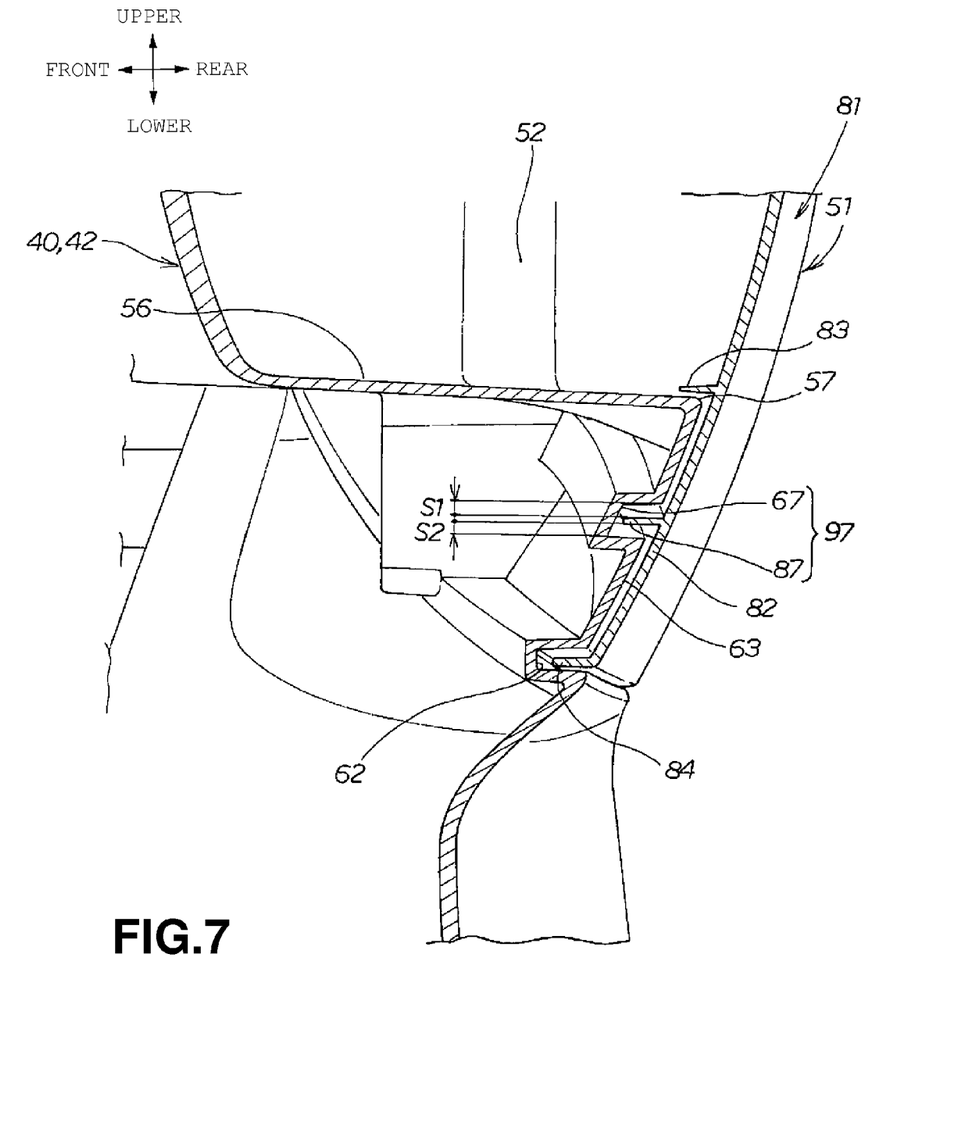
FIG. 7 is a cross-sectional view of the front storage compartment, taken along line 7-7 of FIG. 3.

As shown in FIG. 7, the recess 62 on the inner cover 42 extends in a direction normal to the sheet of FIG. 7 and receives therein the lower edge rib 84 disposed on the lower edge of the plate member 51 and projecting substantially forwardly with respect to the vehicle. The rib 87 as a step and the groove 67 as a step fitting over the rib 87 are disposed above the recess 62 and extend in a direction normal to the sheet of FIG. 7. The intermediate rib 83 extends substantially forwardly with respect to the vehicle in covering relation to an upper portion of the corner 57. The intermediate rib 83 is effective to make the gap between the floor panel 56 and the plate member 51 and water channels 97 hard to see from the opening of the front storage compartment 50. That is, the intermediate rib 83 conceals the water channels 97 and the gap between the floor panel 56 and the plate member 51 and 97.

The water channels 97 are made up of the groove 67 formed as a step in the cover member (the inner cover 42) and the rib 87 provided as a step on the lower extension 82 of the plate member 51. The water channels 97 serve to guide water into the water drain hole (FIG. 8, the reference numeral 65). The water passes through the gap formed between the groove 67 and the rib 87.

The rib 87 is loosely fitted in the groove 67 with upper and lower gaps (S1, S2) each having a width of about 2 mm. The gaps (51, S2) absorb dimensional variations between the rib 87 and the groove 67 and allow water to flow easily along the water channels 97 under surface tension.

The above structure is a left structure of the water channel in the transverse direction of the vehicle. A right structure of the water channel in the transverse direction of the vehicle is similar to the above structure and will not be described below.

In the present embodiment, the water channel is provided by combining the leg shield and the plate member. However, the water channel may be formed by a step provided on either one of the leg shield and the plate member.

If the water channel is provided by a part separate from the cover member, e.g., a pipe member or the like, then the number of parts used is increased, resulting in an increase in the cost.

According to the present invention, since the water channels 97 are integrally formed with the inner cover 42, the number of parts used is reduced. In addition, the water channels 97 are of a simple construction as they are provided by the steps (67, 87).

In the present embodiment, the step on the cover member is in the form of a groove. However, the step on the cover member may be in the form of a rib, and a groove corresponding to the rib may be provided on the plate member.

The water drain hole that is positions at center in the transverse direction of the vehicle will be described below.

As shown in FIG. 8, the water drain hole 65 is formed in the inner cover 42, and the lower engaging finger 86 on the lower edge of the plate member 51 engages in the water drain hole 65. The lower engaging finger 86 extends forwardly with respect to the vehicle and then downwardly with respect to the vehicle, so that the lower engaging finger 86 guides water guided by the groove 67 forwardly of the front storage compartment 50.

The water drain hole 65 doubles as an attachment hole through which the lower extension 82 is installed on the inner cover 42.

According to the present invention, the lower engaging finger 86 of the lower extension 82 of the plate member is installed on the inner cover 42 through the water drain hole 65. Consequently, the plate member 51 is reliably supported on the inner cover 42 without the need for an increase in the number of parts used.

The structure and operation of the water channel on the lower portion of the front storage compartment will be described below.

Figure 9:
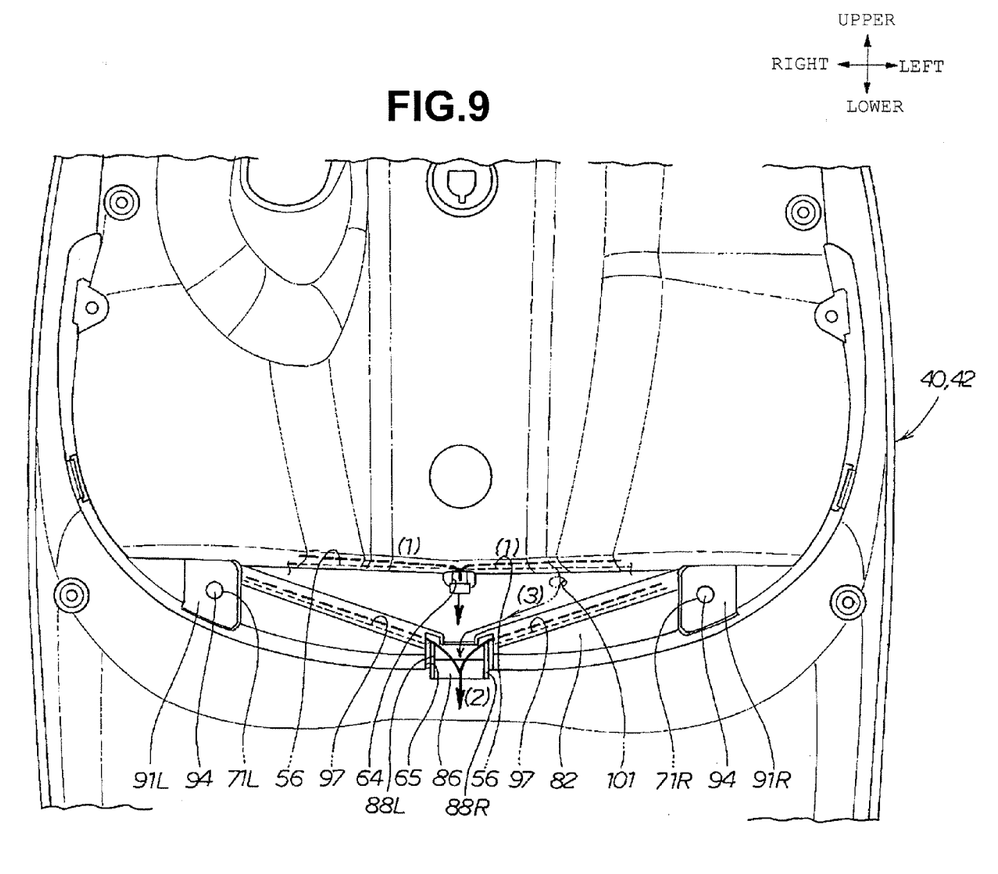
FIG. 9 is a detail plan view showing a portion of a cover member, which is illustrative of structure and operation of the front storage compartment structure of the present invention.

As shown in FIG. 9, the water channels 97 for guiding water to the water drain hole 65, which are constructed of the steps 67, 87 (FIG. 7) extending obliquely upwardly and laterally in the transverse direction of the vehicle from the water drain hole 65, are provided between the lower extension 82 and the inner cover 42. The inner cover 42 of the cover member 40 has the left and right lower mounts 71L, 71R by which the lower extension 82 is secured to the inner cover 42, at positions above the water drain hole 65.

The steps 67 extend from positions near the left and right lower mounts 71L, 71R toward the water drain hole 65 formed substantially at a center in the transverse direction of the vehicle.

Operation of the front storage compartment structure of the vehicle described above will be described below.

The water drain hole 65 for guiding water which has entered the storage unit 52 where articles can be placed and leaked downwardly, to the reverse side of the inner cover is formed below the floor panel 56, and the water channels 97 for guiding the water to the water drain hole 65 are provided so as to extend from the water drain hole 65 obliquely upwardly and laterally in the transverse direction of the vehicle. The water channels 97 and the water drain hole 65 are covered with the lower extension 82 of the plate member 51 (FIG. 7).

The floor panel 56 of the front storage compartment 50 is slightly inclined toward the center in the transverse direction of the vehicle. Therefore, much of rainwater which has reached the floor panel 56 of the front storage compartment 50 flows from the bottom hole 64 out of the front storage compartment 50, i.e., to the reverse side of the inner cover, as indicated by the arrows (1) in FIG. 9. As the floor panel 56 is inclined slightly downwardly toward the center in the transverse direction of the vehicle, water flows easily into the bottom hole 64.

Rainwater which does not flow into the bottom hole 64, but falls downwardly through the gap between the floor panel 56 and the plate member 51 flows down the bottom lower side surface 63 and reaches the water channels 97 (FIG. 7). The rainwater then flows down the water channels 97 and reaches the lower engaging finger 86 which engages in the water drain hole 65, and flows down the lower engaging finger 86 into the water drain hole 65 out of the front storage compartment 50, i.e., to the reverse side of the inner cover, as indicated by the arrow (2) in FIG. 9.

Consequently, the rainwater which has entered the storage unit 52 is guided down the water channels 97 into the water drain hole 65, and either flows to the reverse side (front surface) of the inner cover 42 or flows downwardly through the gap between the floor panel 56 and the plate member 51.

Much of the water which flows downwardly through the gap between the floor panel 56 and the plate member 51 flows down the water channels 97 and through the water drain hole 65 to the reverse side (front surface) of the inner cover 42.

As also shown in FIGS. 2 and 3, since the ribs 87 (87L, 87R) extend contiguously along the left and right small ribs 88L, 88R on the left and right ends of the lower engaging finger 86, they guide the water flowing down the water channels 97 reliably to the water drain hole 65, and reinforce the lower engaging finger 86.

As the water channels 97 and the water drain hole 65 are covered with the lower extension 82, the water channels 97 and the water drain hole 65 are concealed from external view.

According to the present invention, the water channels 97 are covered with the lower extension 82. Even when water overflows the water channels 97 and seeps onto the bottom lower side surface 63 (FIG. 7), inasmuch as the water channels 97 on the bottom lower side surface 63 are covered with the lower extension 82, the amount of water seeping onto the surface 42a of the cover member is reduced. As the amount of water seeping onto the surface 42a of the cover member is reduced, the surface 42a of the cover member is not liable to be smeared by the seeping water.

According to the present invention, therefore, since the water channels 97 and the water drain hole 65 are covered with the lower extension 82, the appearance of the front storage compartment 50 is improved. As the water channels 97 are covered with the lower extension 82, the amount of water seeping onto the surface 42a of the cover member is reduced, making less impaired the appearance of the front storage compartment 50 and the areas around the front storage compartment 50.

As also shown in FIG. 7, each of the water channels 97 is constructed of a simply shaped combination of the groove 67 and the rib 87 corresponding thereto. The water channels 97 thus constructed can be made complex in cross-sectional shape, thereby reducing an amount of water which flows down the bottom lower side surface 63 before reaching the water drain hole 65 from the step 67. As a result, the water channels 97 can guide much water to the water drain hole 65.

The steps 67 (left and right grooves 97) extend from positions near the left and right lower mounts 71L, 71R of the inner cover 42 to the water drain hole 65, and the steps 67 (left and right ribs 87) extend from positions near the left and right lower seats 91L, 91R of the plate member 51 to the water drain hole 65.

According to the present invention, since the steps 67 are disposed near the supports 70, the steps (grooves 67) of the cover member and the steps (ribs 87) of the plate member can be positioned with high accuracy. As the ribs 87 engage in the grooves 67 with increased accuracy, the dimensional accuracy of the water channels 97 is increased.

In the present embodiment, two holes, i.e., the bottom hole 64 and the water drain hole 65 are formed in the inner cover 42. However, another drainage hole 101 may be formed in the floor panel 56 as indicated by the imaginary lines in FIG. 9. If the hole 101 is formed in the floor panel 56, then rainwater on the bottom flows through the drainage hole 101 as indicated by the arrow (3).

The front storage compartment structure for vehicles according to the present invention is applied to a motorcycle in the embodiment. However, the front storage compartment structure for vehicles according to the present invention is also applicable to three-wheeled vehicles and general vehicles.

Industrial Applicability

The present invention is suitable for motorcycles with a front storage compartment.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A front storage compartment structure for a vehicle having a vehicle body and a cover member covering part of the vehicle body, said front storage compartment structure comprising:
    a plate member mounted on the cover member, the plate member and the cover member cooperating to define a storage unit therebetween, said storage unit being open upwardly for receiving articles therein introduced from above; and
    a floor panel extending from said cover member for closing off a bottom portion of said storage unit;
    wherein:
    said cover member has a water drain hole formed therein for draining water from said storage unit, said water drain hole being located at a position below said floor panel;
    said plate member has a lower extension formed on a lower portion thereof which covers a portion of said cover member having said water drain hole formed therein;
    said lower extension of the plate member and said cover member define a water channel therebetween; and
    said water channel extends from the water drain hole obliquely upwardly and laterally in a transverse direction of the vehicle for guiding the water to said water drain hole.

2. The front storage compartment structure for a vehicle according to claim 1, wherein said water channel comprises a step formed on said cover member.

3. The front storage compartment structure for a vehicle according to claim 2, wherein
    said step on said cover member comprises one of a first rib and a first groove; and
    said plate member has one of a second groove and a second rib corresponding to respective one of the first rib and the first groove of the cover member.

4. The front storage compartment structure for a vehicle according to claim 3, wherein
said cover member includes a mount for securing said lower extension of the plate member to said cover member, said mount being located at a position above said water drain hole; and
said step on the cover member extends from a position near said mount to said water drain hole.

5. The front storage compartment structure for a vehicle according to claim 1, wherein in an assembled state of the front storage compartment structure, said water drain hole doubles as an attachment hole through which said lower extension is installed on said cover member.

6. The front storage compartment structure for a vehicle according to claim 2, wherein in an assembled state of the front storage compartment structure, said water drain hole doubles as an attachment hole through which said lower extension is installed on said cover member.

7. The front storage compartment structure for a vehicle according to claim 3, wherein in an assembled state of the front storage compartment structure, said water drain hole doubles as an attachment hole through which said lower extension is installed on said cover member.

8. The front storage compartment structure for a vehicle according to claim 4, wherein in an assembled state of the front storage compartment structure, said water drain hole doubles as an attachment hole through which said lower extension is installed on said cover member.

9. The front storage compartment structure for a vehicle according to claim 1, wherein the plate member comprises an intermediate rib extending laterally in the transverse direction of the vehicle and arranged in a vicinity of the floor panel; and wherein said intermediate rib conceals said water channel and a gap between the floor panel and the plate member.

10. In a scooter vehicle having a vehicle body and a cover member covering a portion of the vehicle body, the improvement comprising a front storage compartment structure comprising:
a plate member mounted on the cover member, the plate member and the cover member jointly defining a storage unit therebetween, said storage unit being open upwardly for receiving articles therein; and
a floor panel extending from said cover member;
wherein:
said cover member has a water drain hole formed therein for draining water from said storage unit, said water drain hole being located at a position below said floor panel of the cover member which closes a bottom portion of said storage unit;
said plate member has a lower extension formed on a lower portion thereof which covers said water drain hole and said cover member at a position below said floor panel;
said lower extension of the plate member and said cover member define a water channel therebetween;
said water channel extends from the water drain hole obliquely upwardly and laterally in a transverse direction of the vehicle for guiding the water to said water drain hole; and
the plate member comprises an intermediate rib extending in the transverse direction of the vehicle and arranged in a vicinity of the floor panel; said intermediate rib configured to conceal said water channel and a gap between the floor panel and the plate member.

11. The front storage compartment structure for a vehicle according to claim 10, wherein said water channel is formed by at least a step formed on said cover member.

12. The front storage compartment structure for a vehicle according to claim 11, wherein said step on said cover member comprises one of a first rib and a first groove;
and wherein said plate member has one of a second groove and a second rib corresponding to respective one of the first rib and the first groove of the cover member.

13. The front storage compartment structure for a vehicle according to claim 12, wherein said cover member includes a mount for securing said lower extension of the plate member to said cover member, said mount being located at a position above said water drain hole;
and wherein said step on the cover member extends from a position near said mount to said water drain hole.

14. The front storage compartment structure for a vehicle according to claim 10, wherein in an assembled state of the front storage compartment structure, said water drain hole doubles as an attachment hole through which said lower extension is installed on said cover member.

15. A vehicle comprising
a vehicle body;
a cover member covering a portion of the vehicle body;
a plate member mounted on the cover member covering the vehicle body, the plate member and the cover member jointly defining a storage unit therebetween, said storage unit being open upwardly for receiving articles therein introduced from above; and
a floor panel extending from said cover member;
wherein:
said cover member has a water drain hole formed therein for draining water from said storage unit, said water drain hole being located at a position below said floor panel of the cover member which closes a bottom portion of said storage unit;
said plate member has a lower extension formed on a lower portion thereof which covers said water drain hole and said cover member at a position below said floor panel;
said lower extension of the plate member and said cover member define a water channel therebetween; and
said water channel extends from the water drain hole obliquely upwardly and laterally in a transverse direction of the vehicle for guiding the water to said water drain hole.

16. A vehicle according to claim 15, wherein said water channel is formed by at least a step formed on said cover member.

17. A vehicle according to claim 16, wherein
said step on said cover member comprises one of a first rib and a first groove; and
said plate member has one of a second groove and a second rib corresponding to respective one of the first rib and the first groove of the cover member.

18. A vehicle according to claim 17, wherein said cover member includes a mount for securing said lower extension of the plate member to said cover member, said mount being located at a position above said water drain hole;
and wherein said step on the cover member extends from a position near said mount to said water drain hole.

19. A vehicle according to claim 15, wherein in an assembled state of the front storage compartment structure, said water drain hole doubles as an attachment hole through which said lower extension is installed on said cover member.

20. A vehicle according to claim 15, wherein the plate member comprises an intermediate rib extending laterally in the transverse direction of the vehicle and arranged in a vicinity of the floor panel; and wherein said intermediate rib conceals said water channel and a gap between the floor panel and the plate member.

* * * * *